April 3, 1956  V. F. DE VOST ET AL  2,740,286
SHOCK TESTER
Filed March 27, 1953  2 Sheets-Sheet 1

INVENTORS
V. F. DEVOST
J. L. LUTTRELL
J. H. ARMSTRONG
J. C. FISHER
J. C. NEW

BY

ATTORNEYS

April 3, 1956

V. F. DE VOST ET AL 2,740,286

SHOCK TESTER

Filed March 27, 1953

INVENTORS
V. F. DEVOST
J. L. LUTTRELL
J. H. ARMSTRONG
J. C. FISHER
J. C. NEW

BY

ATTORNEYS

United States Patent Office 2,740,286
Patented Apr. 3, 1956

2,740,286

SHOCK TESTER

Valmore F. De Vost, Washington, D. C., and John L. Luttrell and John H. Armstrong, Silver Spring, and Jonathan C. Fisher and John C. New, Riverdale, Md., assignors to the United States of America as represented by the Secretary of the Navy Application March 27, 1953, Serial No. 345,272

6 Claims. (Cl. 73—12)

(Granted under Title 35, U. S. Code (1952), sec. 266)

The invention described herein may be manufactured and used by or for the Government of the United States of America for governmental purposes without the payment of any royalties thereon or therefor.

The present invention relates to a testing machine and more particularly to a new and improved drop-tester for testing objects that are to be subjected to shocks during use. More particularly the invention relates to a device for determining resistance to accelerations and velocity change of mechanisms and structures such, for example, as the type of devices used in ordnance missiles. In accordance with such testing operations it may be determined whether the subsequent operation of such mechanisms and structure will be affected by shocks produced during handling and transportation; whether any transient shock induced effects may cause improper or premature operation of such devices; and under what conditions of impact the actuation of inertia actuated devices will occur.

Furthermore, the invention contemplates the provision of a hoisting unit for moving a test vehicle in one direction, such movement being adapted to extend or stretch a flexible shock element including a plurality of resilient members whereupon energy is built up in the resilient member to propel the vehicle in an opposite direction as the vehicle is released from the hoisting unit. The velocity attainable by the test vehicle is controlled by the amount of stretching of the flexible element. The stretching of the resilient member is accomplished as the aforesaid vehicle is hoisted upwardly in a vertical direction by means of a motor driven drum, the resilient member being stretched an amount corresponding to the velocity at which the vehicle is adapted to be propelled in a downwardly direction after being released from the hoisting means. The release device comprises a solenoid carried by the hoisting means and having a hook or latch member actuated thereby and releasably secured to the vehicle, the hook being moved sufficiently to release the vehicle as the solenoid is energized. Upon 75% stretching of the resilient members in the aforesaid manner the test vehicle will be raised 3 feet, the maximum velocity attainable by the test vehicle with a 10 pound load is 80 feet per second. This velocity is reached as the test vehicle initially engages a stop device mounted on a seismic anvil. The principal negative acceleration occurs from the time of the initial impact of the vehicle with the sand filled rubber container of the stop device until the vehicle comes to rest after the impact. A suitable dynamometer is connected to the flexible element and is adapted to indicate the energy of the element when the element has been stretched the desired amount, the reading on the dynamometer being the force in pounds which is to be used in accelerating the test vehicle and the object secured thereto through a predetermined distance.

An object of the present invention is to provide a new and improved testing device wherein means are provided for determining resistance to accelerations of mechanisms and structures that are to be subjected to shocks in service.

Another object of the invention is the provision of a testing device which accelerates the objects to be tested from a position of rest to a desired velocity by means of a force acting for a predetermined period of time.

Another object of the invention is to provide a test machine which utilizes a plurality of resilient elements to produce a controlled shock test.

A further object of the invention is to provide a drop test device wherein the time duration of acceleration is controlled by arresting the accelerating structure by means of a stop element mounted on a yieldably supported seismic anvil.

A still further object of the invention is the provision of a drop tester which utilizes a plurality of resilient elements to accelerate a test vehicle at a predetermined rate of speed, and in which means controlled by the resilient elements indicate the force acting upon the test vehicle and object secured thereto.

Other objects and many of the attendant advantages of this invention will be readily appreciated as the same becomes better understood by reference to the following detailed description when considered in connection with the accompanying drawings wherein.

Figure 1:
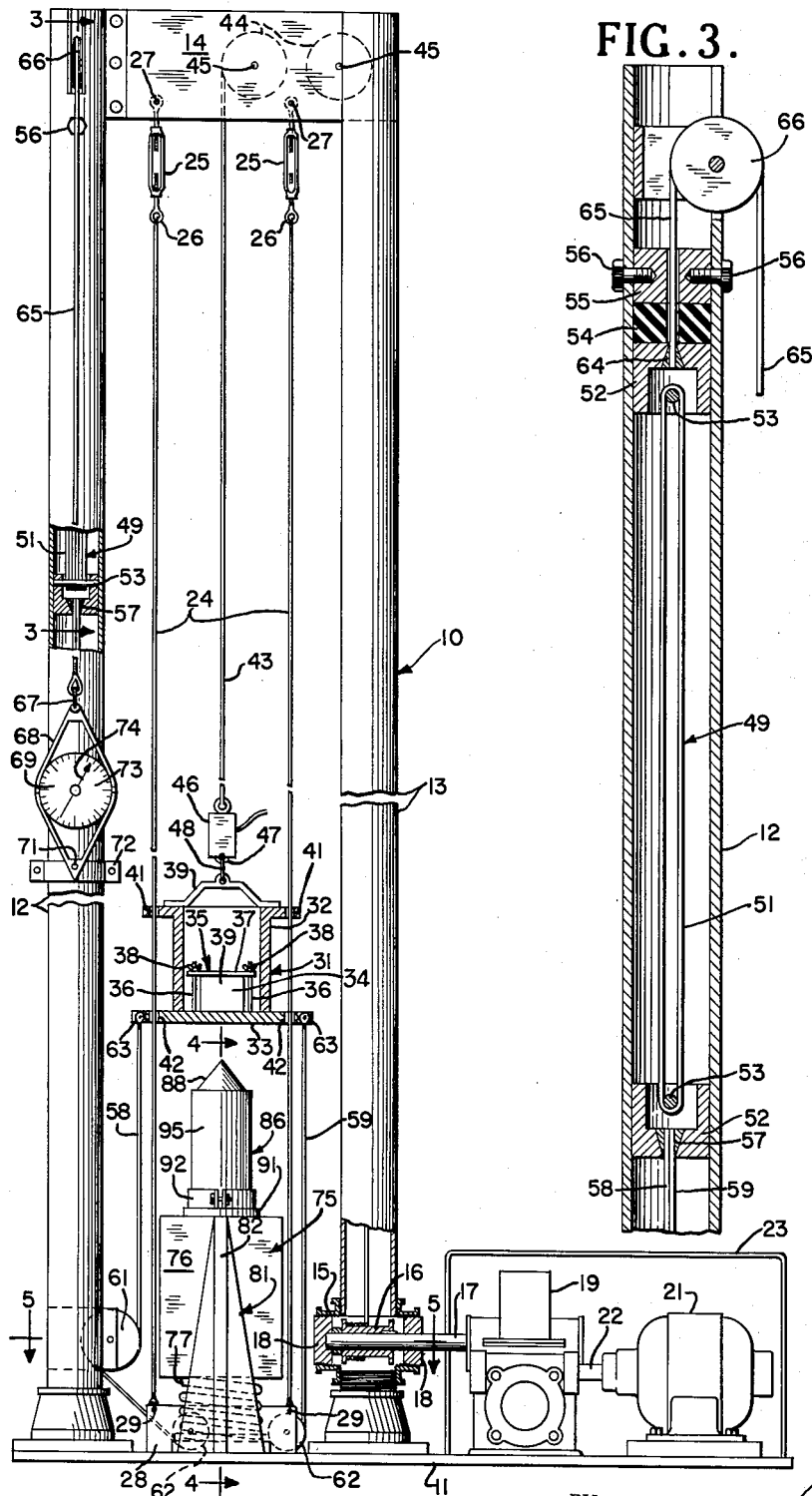
Fig. 1 is a front elevational view of the device of the present invention partially broken away and partially in section.

Referring now to the drawings and more particularly to Fig. 1 thereof, the numeral 10 generally indicates the drop-test device comprising a base plate 11 having a pair of tubular supports 12 and 13 secured thereto in spaced relation with respect to each other. The supports are connected at the upper end thereof by a brace or cross-head 14, the cross-head being secured to the supports in any suitable manner such, for example, as welding the parts together.

The support 13 is provided with a housing 15 at the lower end thereof, Fig. 1. A hoisting drum 16 is arranged within the housing 15 and keyed to a shaft 17 and adapted to be rotated thereby. The shaft 17 is journaled in a pair of bearings 18 carried by the housing 15 and connected to a suitable gear reduction device 19. A suitable power unit such, for example, as a motor 21 is connected to the reduction device 19 by a drive shaft 22. By the aforesaid arrangement rotative movement is imparted to the hoisting drum 16 through the speed reduction device when the motor is in operation. The aforesaid driving means for the drum 16 may be enclosed in a casing 23.

A pair of guide members or cables 24 are arranged between the upstanding spaced supports 12 and 13, the cables being in predetermined spaced relation with respect to each other and extending substantially the full length of the device. As shown more clearly on Fig. 1, one end of each of the cables 24 is secured to a turnbuckle 25 as at 26, the turnbuckles being secured to the cross-head 14 as at 27. The other end of each of the cables is secured to a member 28 as at 29 the member 28 being supported on and secured to the base plate 11 in any suitable manner.

A carriage or test vehicle generally indicated by the reference character 31 is slidably arranged on the guide cables 24 and comprises a cage 32 supported by a base member 33 upon which the device 34 under test is clamped by clamping means 35. While the clamping means comprises a pair of mutually spaced bolts 36 carried by the member 33 and a clamping plate 37 held in clamping engagement with the device 34 by winged nuts 38, it will be understood that any suitable means may be employed for clamping the devices 34 to the member 33. The upper end of the cage 32 is connected by a bridge member 39 and is provided with a pair of upper and lower guide openings 41—42 through which the guide cables 24 extend and thus by this arrangement the cage 32 is slidably supported on the guide cables.

A hoisting cable 43 is disposed about the drum 16, one end of the cable being secured to the drum. The cable extends through the tubular support and is trained over a pair of pulleys 44 supported on the cross-head 14 as at 45. The other end of the cable is secured to a suitable solenoid release device 46 having a hook or latch member 47 releasably secured to a link connection 48 carried by the bridge member 39. It will be understood that the release device is constructed in such a manner as to release the latch member 47 from engagement with the link connection 48 as solenoid is energized whereby the cage may be released at will when a control switch is actuated.

Figure 3:
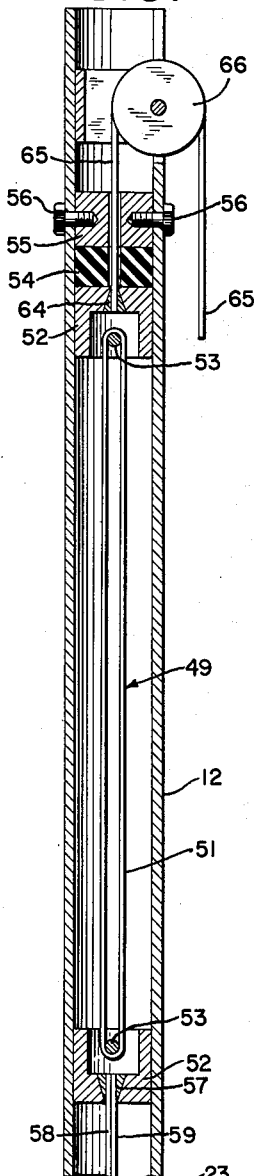
Fig. 3 is an enlarged sectional view taken on the line 3—3 of Fig. 1.
Figure 2:
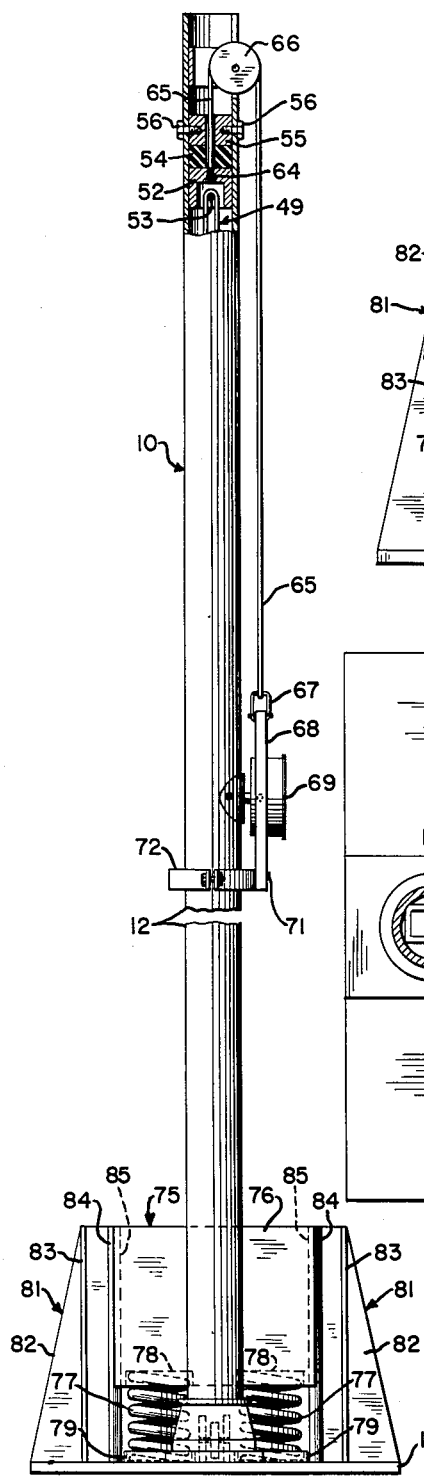
Fig. 2 is a side elevational view of the device of Fig. 1 partially broken away and partially in section.

Disposed within the tubular support 12 is a propelling unit generally indicated by the reference character 49 and comprises a plurality of flexible elements 51 composed of any material suitable for the purpose such, for example, as rubber or the like and adapted to be stretched or tensioned in response to movement of the test vehicle toward the cross-head 14. As more clearly shown on Figs. 1, 2, and 3, the respective ends of the flexible elements are disposed within sockets 52, the flexible element being secured therein in any suitable manner, preferably as by a pin 53. The uppermost socket 52 is normally in engagement with a bumper 54 composed of rubber or the like and maintained in engagement therewith by a sleeve 55 secured to the support by screws 56 the sleeve being composed of any suitable metallic material.

The lowermost sockets have secured thereto as at 57 one end of a pair of cables 58—59, each cable being trained over a pulley 61 mounted on the lower end of the tubular support 12. Cable 59 is trained over an additional pair of pulleys 62 mounted on the support 28, the other ends of each cable being secured to the base 33 of the carriage as at 63. The uppermost socket 52 has secured thereto as at 64 one end of a cable 65, the cable being trained over a pulley 66 mounted on the upper end of the support 12. The other end of cable 65 is secured to the swivel 67 carried by the actuating member 68 of a spring loaded dynamometer 69, which may be of any conventional type known to the art. The lower end of the actuating element 68 is pivotally mounted as at 71 to a bracket 72 secured to the support 12 in any conventional manner. The dynamometer is provided with a calibrated dial 73 and a pointer or indexing element 74 adapted to indicate the force exerted by the flexible element 51 as the element is stretched downwardly in response to movement of the test vehicle 32 upwardly by the aforesaid hoisting arrangement. Thus the velocity attained by the test vehicle as the vehicle is released from the hoisting cable is governed by the distance the flexible element is stretched or elongated.

Figure 4:
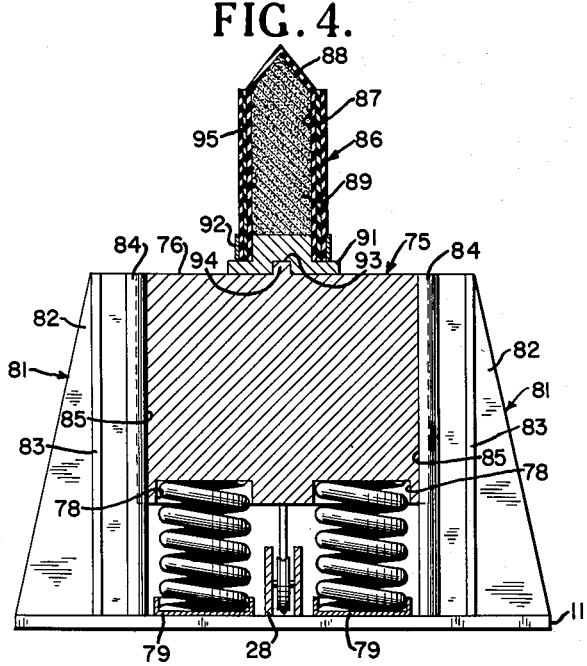
Fig. 4 is an enlarged sectional view taken on the line 4—4 of Fig. 1.
Figure 5:
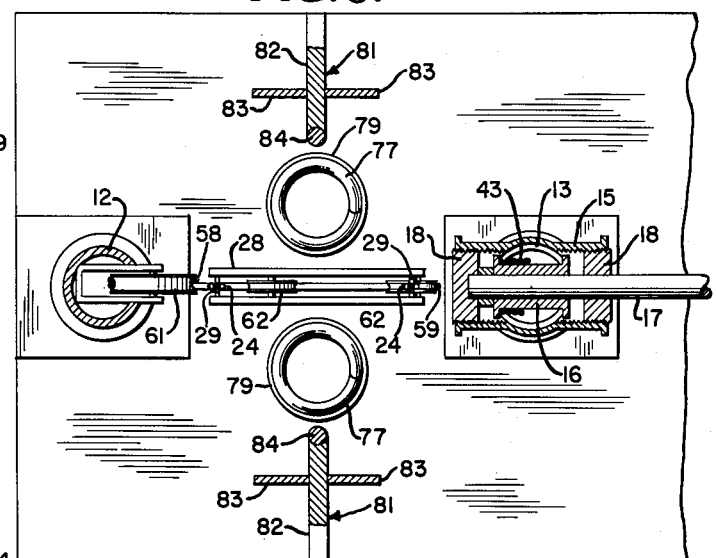
Fig. 5 is an enlarged sectional view taken on the line 5—5 of Fig. 1.

As shown more clearly on Figs. 1 and 4, a seismic anvil, generally indicated by the numeral 75, is disposed beneath the carriage 32 and comprises a substantially rectangular block 76 composed of any material suitable for the purpose such, for example, as steel or the like. The block 76 is supported by a pair of compression springs 77, one end of each spring being disposed within a recess 78 formed in the block 76, the other end of each spring being disposed within retaining member 79 supported on the base plate 11.

The block 76 is supported for sliding movement by a pair of guide members 81, the guide members comprising a plate 82 secured to the base 11 in any suitable manner such, for example, as by welding the parts together. Each plate 82 includes a pair of reinforcing ribs 83 and a guide rod 84 integrally formed therewith the ribs being welded to the base 11. Each guide rod is arranged within a semicircular socket 85 formed in the block 76. By the aforesaid arrangement it will be apparent that the block is yieldably supported by the springs 77 and slidably supported by the aforesaid rod and socket arrangement.

A stop element or bumper device generally indicated by the reference character 86 is arranged on the block 76 of the anvil 75 and comprises a cylindrical container 87 having an impact receiving cone-shaped element 88 formed thereon, the container being composed of rubber or any other suitable resilient material. The container 87 is filled with sand 89 and is secured to a base plate 91 by a conventional split band 92. The base 91 has formed therein a recess 93 having arranged therein a boss 94, the boss being carried by the block 76. By this arrangement the stop-device is secured to the anvil 75 in alignment with the carriage 32 thereby to absorb the initial shock as the carriage is forcibly moved into engagement therewith by the propelling unit as the carriage is released by the release device. If desired the container 87 may be provided with a plurality of elastic bands 95, the bands may be added or removed from the container thereby to control the energy absorption rate of the stop device.

It will be understood that upon 75% elongation or stretching of the flexible element 51 the test vehicle 32 will be moved upwardly substantially 3 feet, the maximum velocity attainable by the test vehicle with a 10 pound load is 80 feet per second. This velocity is reached as the test vehicle initially engages the stop-device mounted on the anvil. The principal negative acceleration occurs from the time the test vehicle initially engages the sand filled rubber container until the vehicle comes to rest. The seismic anvil serves to make the principal negative acceleration pulse independent of mounting or flooring characteristics and also reduces the floor loads to less than 100 lbs. per square foot. The dynamometer is adapted to indicate the tension of the flexible element as the element is stretched in response to movement of the test vehicle by the hoisting arrangement. It will be understood, however, that the reading on the dynamometer 69 is the force in pounds which is effective in accelerating the carriage and the object secured thereto through a predetermined distance.

The formula $F = WA$ may be used to calculate the acceleration where, F is the force in pounds; W is the weight of the carriage assembly plus the moving parts; and A is the acceleration in "$g$." Knowing the acceleration the duration may be calculated and the results employed to plot an acceleration-time curve.

By the aforesaid arrangement a new and improved drop-tester has been devised wherein means are provided for subjecting a test body to any desired acceleration.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent in the United States is:

1. A shock testing device comprising a frame, a pair of guide elements mounted on said frame, a carriage movably mounted on said elements, a power unit, a drum operatively connected to said power unit and rotatable thereby, cable means on said drum and connected to said carriage for imparting upward movement to said carriage as the drum is rotated by said unit, said cable means being connected to the carriage through hook means carried by said cable means and actuatable by a solenoid associated therewith to release position for releasing the carriage when the solenoid is energized, a plurality of resilient bands connected to the carriage and tensioned in response to said upward movement of said carriage for accelerating the carriage in a downward direction when the hook means is actuated to a release position by said solenoid, means including a dynamometer operatively connected to the resilient bands and actuated thereby as the bands are tensioned in response to the upward movement of the carriage for indicating the force applied to the bands, and an energy absorbing device below said carriage and engaged thereby for arresting the downward movement of the carriage.

2. A shock testing device comprising a frame, a carriage movably mounted on the frame, a power driven hoisting drum connected to said carriage by an operative connection for imparting upward movement to said carriage, said operative connection including solenoid-actuated releasable means releasably connecting the carriage to the drum, a solenoid for actuating said releasable means to a release position as the solenoid is energized, a plurality of resilient elements connected to the carriage and tensioned in response to said upward movement of the carriage for accelerating the carriage at a constant rate in a downward direction when the releasable means is actuated to a release position by said solenoid, a dynamometer operatively connected to said resilient elements for indicating the force applied thereto as the elements are tensioned in response to the upward movement of said carriage, and means below the carriage for arresting the downward movement of the carriage.

3. A shock testing device comprising a vertical frame, a carriage movably mounted on said frame, means including a power driven drum and cable for moving said carriage in an upward direction on said frame, said means also including a solenoid carried by said cable and releasably secured to said carriage for releasing the carriage as the solenoid is energized, a plurality of resilient bands connected to said carriage and tensioned in response to said movement of the carriage in an upward direction for accelerating the carriage at a predetermined rate of speed in a downward direction in accordance with the tensioning of said bands when the carriage is released, means including a dynamometer connected to said resilient bands for indicating the force applied thereto in accordance with the tensioning of said bands in response to said movement of the carriage in said upward direction, and means below said carriage to stop movement of the carriage in said downward direction.

4. A shock testing device comprising a vertical frame, a pair of guide elements carried by said frame, a carriage slidably mounted on said elements, a power driven drum, cable means connected to said drum for moving said carriage in an upward direction on said elements as said drum is operated, a solenoid carried by said cable means and releasably connected to said carriage for releasing said carriage as the solenoid is energized, means including a plurality of resilient bands connected to said carriage and tensioned in response to said movement of the carriage in an upward direction for accelerating the carriage at a predetermined rate in a downward direction when the carriage is released by said solenoid, and means below said carriage for arresting the movement of the carriage in said downward direction.

5. A shock testing device comprising a vertical frame, a carriage movably mounted on the frame, a power driven hoisting drum connected by operative means to said carriage for moving said carriage in an upward direction, said means including solenoid-actuated releasable means for releasably connecting the carriage to the drum, a solenoid for actuating said releasable means to a release position as the solenoid is energized, and a plurality of resilient elements connected to the carriage and tensioned in response to said movement of the carriage in an upward direction for accelerating the carriage at a constant rate in a downward direction when the releasable means is actuated to said release position, and means below said carriage to stop movement of the carriage in said downward direction.

6. A shock testing device comprising a vertical frame, a pair of guide elements mounted on said frame, a carriage slidably mounted on said elements for vertical movement thereon, means including a plurality of resilient bands connected to said carriage for accelerating the carriage in a downward direction at a predetermined rate in accordance with the tensioning of said bands caused by movement of the carriage in an upward direction, means including a power driven drum releasably connected to said carriage by an operative connection for moving the carriage in said upward direction to a predetermined position and tensioning the bands sufficiently to cause the carriage to be accelerated downwardly at said predetermined rate, said operative connection including means actuated by a solenoid for releasing said carriage when the carriage has been moved to said predetermined position and said solenoid is energized, and means below said carriage to stop movement of the carriage in said downward direction.

References Cited in the file of this patent

UNITED STATES PATENTS

| 720,575 | Fremont | Feb. 17, 1903 |
| 2,537,096 | Shreeve et al. | Jan. 9, 1951 |
| 2,630,704 | Armstrong | Mar. 10, 1953 |
| 2,656,711 | Eschudi | Oct. 27, 1953 |
| 2,662,392 | Sullivan | Dec. 15, 1953 |